US006962072B2

(12) United States Patent
Weigel

(10) Patent No.: US 6,962,072 B2
(45) Date of Patent: Nov. 8, 2005

(54) FLUID INDUCER EVALUATION DEVICE AND METHOD

(75) Inventor: Matthew J. Weigel, Enumclaw, WA (US)

(73) Assignee: The Boeing Company, Chicago, IL (US)

( * ) Notice: Subject to any disclaimer, the term of this patent is extended or adjusted under 35 U.S.C. 154(b) by 71 days.

(21) Appl. No.: 10/628,233

(22) Filed: Jul. 29, 2003

(65) Prior Publication Data

US 2005/0022583 A1 Feb. 3, 2005

(51) Int. Cl.[7] .................................................. G01M 3/04
(52) U.S. Cl. .......................................... 73/40; 73/865.9
(58) Field of Search ........................ 73/40, 49.6, 865.8, 73/865.9; 408/56

(56) References Cited

U.S. PATENT DOCUMENTS

| 4,587,836 A | 5/1986 | Hewlett ...................... 73/49.8 |
| 4,693,646 A | 9/1987 | Andrews .................... 409/136 |
| 4,865,495 A * | 9/1989 | Hinds .......................... 408/56 |
| 5,067,094 A * | 11/1991 | Hayes ......................... 702/51 |
| 5,595,372 A * | 1/1997 | Patten ..................... 267/64.13 |
| 5,856,615 A | 1/1999 | Easter ........................ 73/1.72 |
| 6,044,697 A * | 4/2000 | Imano ....................... 73/118.1 |
| 6,050,296 A * | 4/2000 | Hoffmann et al. .......... 137/552 |
| 6,105,595 A | 8/2000 | Jensen ......................... 137/15 |
| 6,279,383 B1 * | 8/2001 | Balke et al. ................... 73/40 |
| 2003/0066340 A1 * | 4/2003 | Hassenflug .................... 73/46 |

FOREIGN PATENT DOCUMENTS

| EP | 0758568 A1 | 2/1997 |
| GB | 1315446 | 5/1973 |

\* cited by examiner

Primary Examiner—Hezron Williams
Assistant Examiner—John Fitzgerald
(74) Attorney, Agent, or Firm—Baker & Hostetler LLP

(57) ABSTRACT

A fluid inducer having an inducer valve operable to open in response to a load is evaluated by an evaluation device. This device includes a fluid conduit for pressurizing the fluid inducer with a fluid and a pressure sensor that senses the pressure in the fluid conduit. In addition, the device includes an actuator for applying the load to the fluid inducer and a load sensor that determines the load in response to the sensed pressure.

40 Claims, 4 Drawing Sheets

FLUID INDUCER EVALUATION DEVICE AND METHOD

FIELD OF THE INVENTION

The present invention generally relates to evaluation of a fluid inducer device. More particularly, the present invention pertains to a method and device for evaluating a fluid inducer device.

BACKGROUND OF THE INVENTION

When machining a variety of materials such as metals and composites, lubricating fluid and/or air is generally utilized to facilitate heat transfer and/or chip removal. In the case of relatively small items that may be placed within a milling machine, for example, a stream of fluid or coolant may be delivered to the milling site via a fluid line separately arranged from the cutting tool. However, when forming relatively deep holes and/or when machining relatively large items, for example, with portable milling devices, it may be advantageous to deliver fluid more directly to the tip of the cutter. So called fluid chucks are generally utilized to both hold these cutting tools and provide for fluid delivery. These fluid chucks typically include a fluid coupling and a conduit to deliver coolant to the cutting tool.

A disadvantage associated with some conventional fluid chucks is that the flow of fluid is not regulated in connection with the cutting action and thus, fluid may flow out of the cutting tool while no milling action is being performed. In an attempt to overcome this disadvantage, automatic shutoff valves have been incorporated into fluid chucks. These automatic valves are generally referred to as "inducers" as they are induced to initiate coolant flow in response to contact with a material being machined. However, these known fluid inducers have not fully overcome these disadvantages and, by way of example, are sometimes susceptible to leaking. Also, these inducers occasionally "stick" and fail to shut off the flow of fluid at the completion of a cutting operation. Problems associated with stuck valves include fluid waste and "back side contamination." The phrase "back side contamination" refers to fluid discharged by the cutting tool after penetration of the material. That is, as the milling tool or drill bit exits through the back of the material, fluid continues to flow and splashes the back side of the material. This problem may be particularly troublesome in the aerospace industry. For example, when machining airframes, back side contamination may foul the interior of the airframe necessitating additional cleaning operations and involving time and money. In addition, there are health concerns associated with cooling fluids. Therefore, back side contamination may have a negative impact on the health of machine operators in the vicinity.

Another disadvantage associated with known fluid chucks having automatic shutoff is that the preload and travel are factory set. The term "preload" refers to an amount of resistance the automatic shutoff mechanism requires to open it for flow, and thus relates to the force required to open the shutoff valve and start the flow of fluid. The term "travel" refers to the degree of movement of the automatic shutoff mechanism required to open the shutoff valve and start the flow of fluid. Optimal preload and travel depend upon a variety of factors such as type and thickness of material machined, diameter of cutting tool, feed rates, and the like. Consequently, the factory settings are usually only optimal for a relatively narrow range of cutting operations.

Yet another disadvantage associated with known inducers is that the preload and travel settings are generally not adjustable and may tend to fluctuate with time and use.

Accordingly, it is desirable to provide a method and apparatus capable of overcoming the disadvantages described herein at least to some extent.

SUMMARY OF THE INVENTION

The foregoing needs are met, to a great extent, by the present invention, wherein in one respect a device is provided that in some embodiments evaluates a fluid inducer.

An embodiment of the present invention pertains to a device for evaluating a fluid inducer. This fluid inducer has an inducer valve operable to open in response to a load. The device includes a fluid conduit, a pressure sensor, and actuator and a load sensor. The fluid conduit pressurizes the fluid inducer with a fluid. The pressure sensor senses the pressure in the fluid conduit. The actuator applies the load to the fluid inducer. The load sensor determines the load in response to the sensed pressure.

Another embodiment of the present invention relates to an apparatus for evaluating a fluid inducer. This fluid inducer has an inducer valve operable to open in response to a load. The apparatus includes a means for pressurizing the fluid inducer with a fluid and a means for determining a fluid integrity of the fluid inducer in response to sensing the pressure of the fluid. The apparatus further includes a means for determining a load response of the fluid inducer in response to a load being exerted upon the fluid inducer.

Yet another embodiment of the present invention pertains to a method of evaluating a fluid inducer. This fluid inducer has an inducer valve operable to open in response to a load. In the method the fluid inducer is pressurized with a fluid and a fluid integrity of the fluid inducer is determined in response to sensing the pressure of the fluid. In addition, a load response of the fluid inducer is determined in response to a load being exerted upon the fluid inducer.

There has thus been outlined, rather broadly, certain embodiments of the invention in order that the detailed description thereof herein maybe better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

The present invention provides a fluid inducer evaluation device and a method of evaluating the fluid inducer. In some embodiments, the invention provides for a fluid inducer evaluation device for determining various parameters of the fluid inducer. These parameters include, for example, integrity of the inducer valve, amount of pre-load tension, "cracking" pressure, travel distance, "full open" travel, and the like. To determine the integrity of the inducer valve, the fluid inducer evaluation device includes a fluid conduit for pressurizing the fluid inducer with a fluid and a pressure sensor that determines the pressure in the fluid conduit. To determine the preload tension and travel distance, the fluid inducer evaluation device also includes an actuator for applying the load to the fluid inducer and a load sensor to sense the load.

In other embodiments, the invention provides a method of evaluating a fluid inducer. In this method, the fluid inducer is pressurized with a fluid and a fluid integrity of the fluid inducer is determined in response to sensing the pressure of the fluid. In addition, a load response of the fluid inducer is determined in response to a load being exerted upon the fluid inducer. In particular, the pre-load tension or "cracking pressure" is determined to be the load at which the inducer valve is opened. In addition the travel is determined to be a maximum amount the fluid inducer may be compressed without permanently deforming the fluid inducer. Furthermore, the full open travel is determined to be an amount of travel at which further opening of the inducer valve does not result in greater flow of fluid.

Advantages of various embodiments of the invention may include, for example: (1) determine preload of inducer; (2) determine travel distance of inducer; (3) determine full open travel of inducer; and/or (4) failure test inducer.

Figure 1:
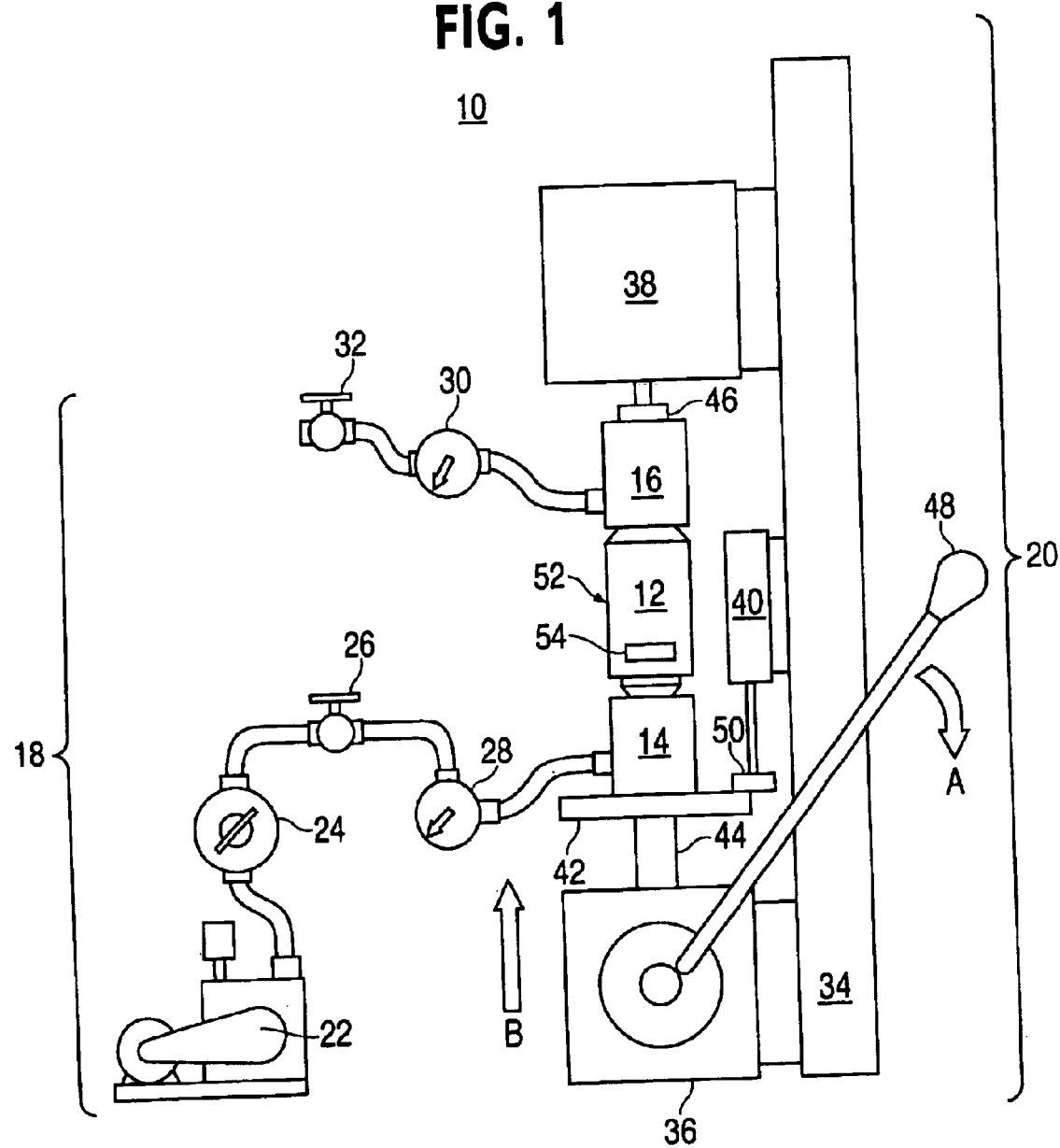
FIG. 1 is block diagram of an evaluation device according to an embodiment of the invention.

Preferred embodiments of the invention will now be described with reference to the drawing figures, in which like reference numerals refer to like parts throughout. As shown in FIG. 1 an inducer testing system 10, also referred to as a tester 10 is configured to test an inducer 12. To facilitate disposing the inducer 12 within the tester 10, a tail adapter 14 and head adapter 16 are respectively disposed on either end of the inducer 12. In order to test various parameters of the inducer 12, the tester 10 includes a fluid conduit 18 and a press 20.

The fluid conduit 18 includes a pressure source 22, a regulator 24, an inlet valve 26, an inlet pressure sensor 28, an outlet pressure sensor 30, and an outlet valve 32. The pressure source 22 is configured to generate and/or provide pressure of a fluid such as air, water, oil, and the like. In various embodiments of the invention, the pressure source 22 may include a pump, a container of pressurized fluid, and the like. In addition, a vacuum source may be utilized to replace or supplement the action of the pressure source 22. The regulator 24 is configured to modulate fluid pressure supplied by the pressure source 22. The regulator 24 may be manually adjustable and/or electronically controlled. Suitable examples of regulators include at least, piston-type regulators, diaphragm-type regulators, proportional air valves, and the like. However, the regulator 24 is optional and, for example, given a pressure source 22 configured to suitably regulate fluid pressure, the regulator 24 may be omitted.

The inlet valve 26 and outlet valve 32 are configured to modulate the flow of fluid flowing respectively therethrough. For example, the inlet valve 26 is disposed upstream of the inducer 12. That is, the inlet valve 26 is disposed between the pressure source 22 and the inducer 12 and configured to control the flow of fluid to the inducer 12 from the pressure source 22. The outlet valve 32 is disposed downstream of the inducer 12 and configured to control the flow of fluid out of the fluid conduit 18. The inlet pressure sensor 28 and outlet pressure sensor 30 are configured to sense the pressure of the fluid at their respective locations and display or output these respective sensed pressures. Any suitable pressure sensor may be utilized. Examples of suitable pressure sensors include pressure gauges, pressure transducers and the like.

To test the inducer 12, it is disposed between the inlet pressure sensor 28 and the outlet pressure sensor 30. For example, the tail adapter 14 and the head adapter 16 may be threaded or otherwise attached to the inducer 12, the inlet pressure sensor 28 may be attached to the tail adapter 14, and the head adapter 16 may be attached to the outlet pressure sensor 30. In addition, the various components of the fluid conduit 18 are operably attached one to another. For example, a plurality of hoses, pipes, fittings and/or the like may be utilized to interconnect the various components of the fluid conduit 18.

The press 20 includes a stand 34 on to which is attached an actuator 36, load cell 38, and linear potentiometer 40. The actuator 36 is configured to apply force to the inducer 12. The load cell 38 is configured to determine the amount of force applied to the inducer 12. The linear potentiometer 40 is configured to determine an amount of travel exhibited by the inducer 12. In addition, the actuator 36 includes a platform 42 attached to the actuator 36 via a shaft 44. The platform 42 is configured to provide a surface on to which the tail adapter 14 may rest. In this manner, force generated by the actuator 36 may be translated via the shaft 44, the platform 42 and the tail adapter 14 to the inducer 12. Furthermore, this force is translated through the inducer 12 and to the load cell 38 via the head adapter 16 and an arm 46 of the load cell 38. The functionality of the various individual components described herein may be subsumed within other components of the tester 10. For example, the tail adapter 14, the platform 42 and the shaft 44 may be incorporated into a single component configured to provide the functionality of the tail adapter 14, the platform 42 and the shaft 44.

In an embodiment of the invention, the actuator 36 includes a handle 48. This handle 48 is operable to be moved, by a user for example, in direction A. In response to the handle 48 moving in direction A, the actuator 36 is configured to produce a movement of the platform 42 in direction B. However, in various other embodiments, the actuator 36 may move the platform 42 in direction B in any suitable manner. For example, the actuator 36 may include a pneumatic ram, servo motor, and the like.

To determine an amount of travel or movement of the inducer 12 during testing, the linear potentiometer 40 includes an arm 50. This arm 50 is configured to rest upon the platform 42 and move in response to movement of the platform 42. In addition, the arm 50 and/or the linear potentiometer 40 may be positioned or reset to zero prior to testing of the inducer 12. In various other embodiments, the arm 50 may be attached to the tail adapter 14 or any other suitable structure such that the linear potentiometer 40 is operable to sense the travel of the inducer 12 during testing. Furthermore, the linear potentiometer 40 may be incorporated within the actuator 36 and thus, the arm 50 is optional and may be omitted. In this regard, servo motors typically are position aware and thus, if the actuator 36 includes a servo motor, the functionality of the linear potentiometer 40 may be assumed by the actuator 36.

In various embodiments of the invention, the tester 10 is configured to evaluate the action of an inducer valve 52 disposed within the inducer 12. The location and conformation of the inducer valve 52 may depend upon the particular type of fluid inducer to be tested. A description and illustration of at least one suitable inducer valve may be found in co-pending U.S. patent application Ser. No. Not Yet Assigned, filed NOT YET FILED 2003, titled Fluid Chuck Device, the disclosure of which is incorporated herein by reference in its entirety.

To facilitate associating test results with the particular fluid inducer being tested, the inducer 12 may optionally include an identification mark and/or device (ID) 54. This ID 54, if present, may be in the form of a Universal Product Code (UPC)/European Article Number (EAN) bar code, a radio frequency(RF) tag, or the like. Furthermore, it is within the scope of the invention that the ID 54 may be at least one engraved, stenciled or stamped alpha numeric character.

Figure 2:
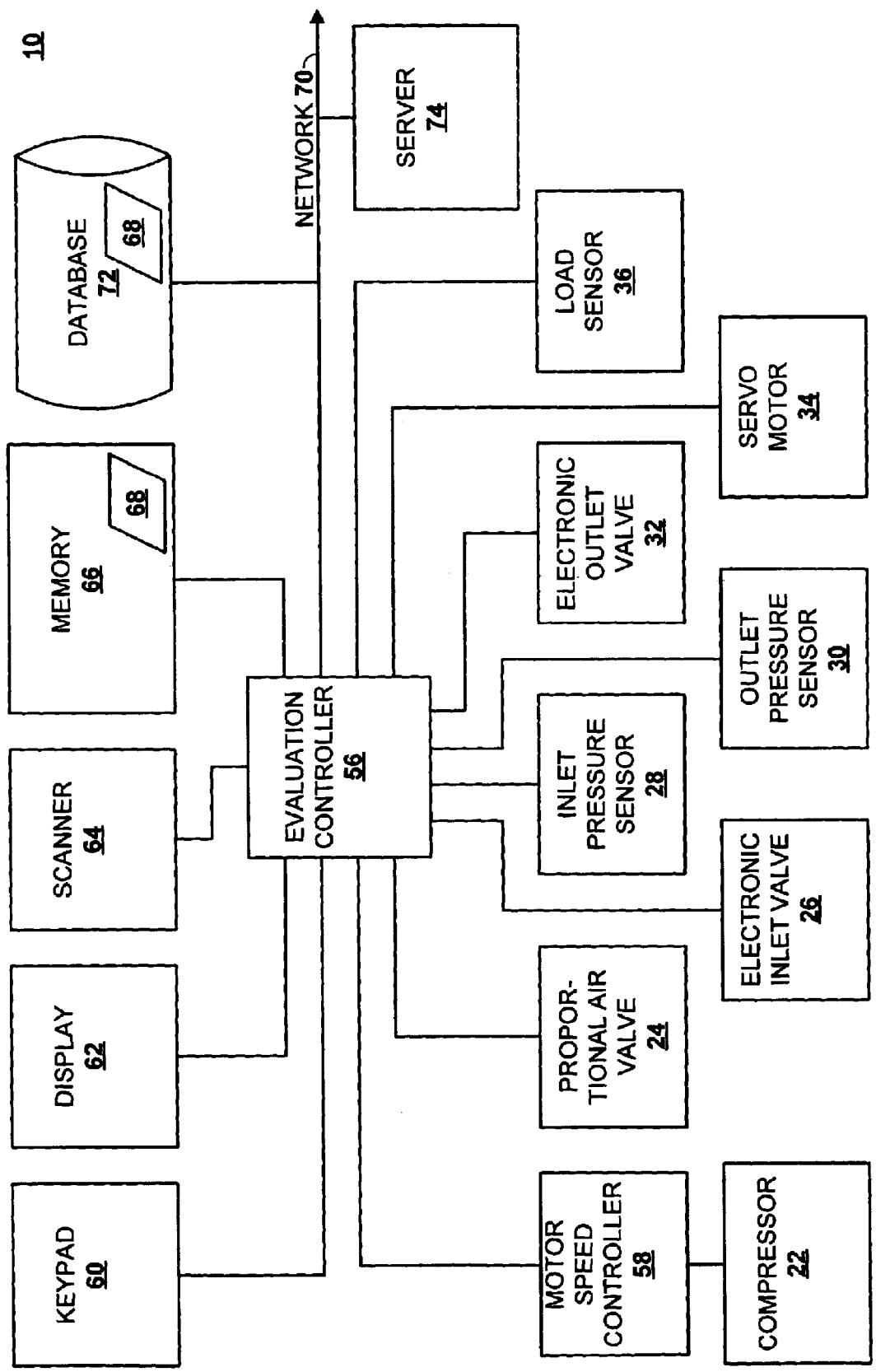
FIG. 2 is a system diagram of the evaluation device according to another embodiment of the invention.

FIG. 2 is a system diagram of the tester 10 according to another embodiment of the invention. The tester 10, according to the embodiment described in FIG. 2, is similar to the embodiment described in FIG. 1. Thus, in the interest of brevity, those elements described in FIG. 1 will not be again described with respect to FIG. 2. As shown in FIG. 2, the tester 10 includes an evaluation controller 56. This evaluation controller 56 is configured to control and modulate the various components of the tester 10. Therefore, each of the various components of the tester 10 of this embodiment are configured to be directly and/or indirectly controlled electronically. For example, to control the operation of the pressure source 22, the tester 10 may include a motor speed controller 58 configured to receive instructions output from the evaluation controller 56 and, based on these instructions, modulate a motor of a compressor serving as the pressure source 22.

The tester 10 may, optionally, include a multitude of additional components such as a keypad 60, display 62, scanner 64, and memory 66. These and other components may be configured to intercommunicate with the evaluation controller 56 in any suitable manner. For example, intercommunication may be performed via wires and/or in a wireless manner. The keypad 60 is configured to provide the user the capability to forward instructions to the evaluation controller 56. For example, the keypad 60 may include keys to start test, stop test, fatigue test, tare weight, change mode, and the like. The display 62 is configured to provide visual information to the user. For example, in response to information forwarded by the evaluation controller 56, the display 62 may display such information as test status, results of a test, and the like. In another form, the display 62 may include a touch screen configured to provide a data entry capacity to the user. In this regard, the functionality of the keypad 60 may be subsumed within the display 62.

The scanner 64 is configured to sense the identity of the identification (ID) 54. This ID 54, if present, may be in the form of a Universal Product Code (UPC)/European Article Number (EAN) bar code, a radio frequency (RF) tag, or the like. Accordingly, depending upon the specific form of the ID, the scanner 64 may be configured to sense the various ID forms. In this manner, results of any tests performed upon the inducer 12 may be stored and a testing history of the inducer 12 may be maintained. In this regard, the memory 66 is configured to store data received from the evaluation controller 56 and forward data requested by the evaluation controller 56. Examples of data that may be stored to the memory 66 include IDs, sensor readings, dates, response profile of the load sensor 36, and the like. In order to consolidate any test results for a particular inducer 12, a table 68 may be stored to the memory 66. This table 68 may be created in response to testing the inducer 12 a first time. Test results corresponding to this first test and any subsequent testing of the inducer 12 may be stored to the table 68. In this manner, a testing history may be evaluated for the inducer 12 and a performance trend may be extrapolated. It is an advantage of embodiments of this invention that the performance trend may be utilized to facilitate maintenance or retirement of the inducer 12 prior to failure.

The tester 10 may further include a network 70 configured to intercommunicate with the evaluation controller 56. The network 70 may include a local area network (LAN), wide area network (WAN), wireless network, the Internet, and the like. The network 70 may further include, for example, a database 72, server 74, and a multitude of other networked devices. The database 72 may be configured to store the table 68.

Figure 3:
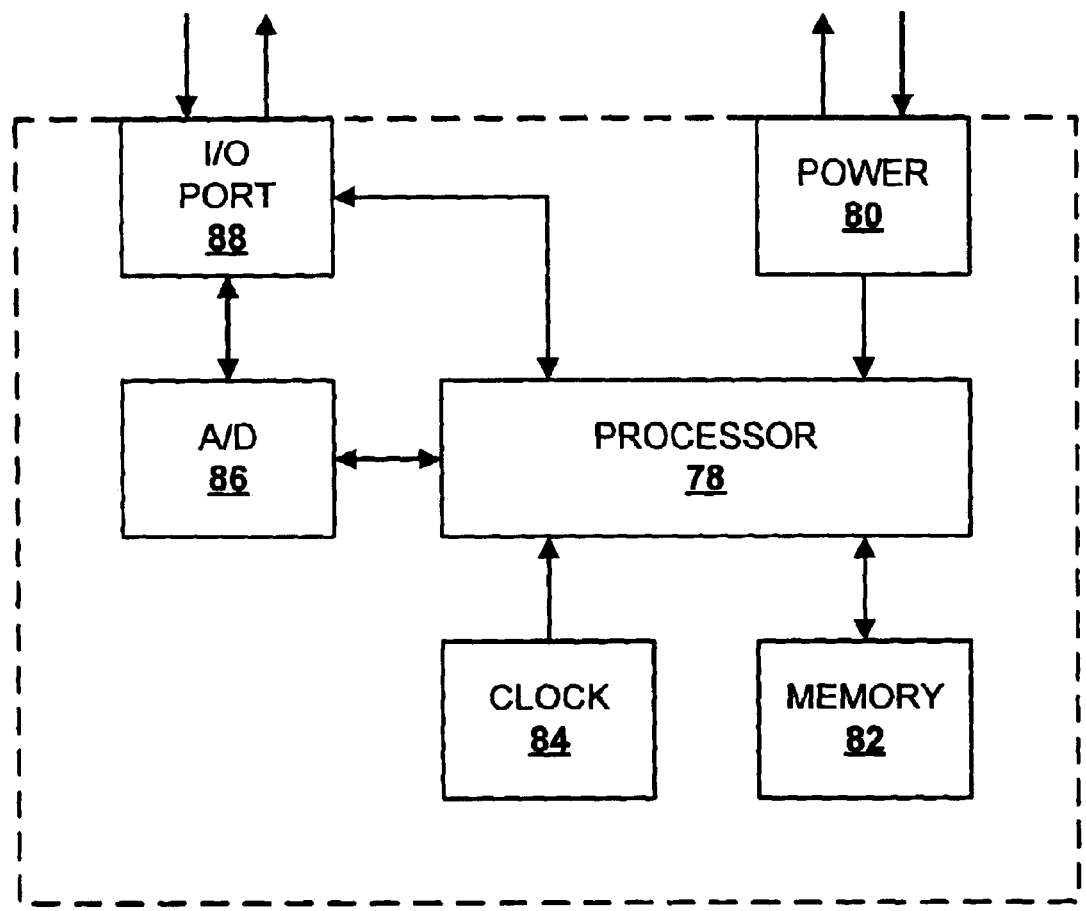
FIG. 3 is a system diagram of a controller suitable for use in the evaluation device.

FIG. 3 is a system architecture for the evaluation controller 56 suitable for use in the tester 10 according to FIG. 2. As shown in FIG. 3, the evaluation controller 56 includes a processor 78. This processor 78 is operably connected to a power supply 80, memory 82, clock 84, analog to digital converter (A/D) 86, and an input/output (I/O) port 88. The I/O port 88 is configured to receive signals from any suitably attached electronic device and forward these signals to the A/D 86 and/or the processor 78. For example, the I/O port 88 may receive signals associated with load sensed by the load cell 38, the inlet pressure sensor 28 and/or the outlet pressure sensor 30 and forward the signals to the processor 78. If the signals are in analog format, the signals may proceed via the A/D 86. In this regard, the A/D 86 is configured to receive analog format signals and convert these signals into corresponding digital format signals. Conversely, the A/D 86 is configured to receive digital format signals from the processor 78, convert these signals to analog format, and forward the analog signals to the I/O port 88. In this manner, electronic devices configured to receive analog signals may intercommunicate with the processor 78.

The processor 78 is configured to receive and transmit signals to and from the A/D 86 and/or the I/O port 88. The processor 78 is further configured to receive time signals from the clock 84. In addition, the processor 78 is configured to store and retrieve electronic data to and from the memory 82. Furthermore, the processor 78 is configured to determine signals operable to modulate the motor speed controller 58 and/or the regulator 24 and thereby control the pressure within the fluid conduit 18. Similarly, the processor 78 is configured to modulate the inlet valve 26, outlet valve 32, and actuator 36.

According to an embodiment of the invention, the processor 78 is configured to determine if there is a leak in the fluid conduit 18 and, if so, where the leak is occurring. For example, the processor 78 may control the actuator 36 to remove any force upon the inducer 12 and thereby facilitate closing the inducer valve 52. The processor 78 may further control the pressure source 22 to provide pressure, the inlet valve 26 to open, and the outlet valve 32 to close. In this manner, the fluid conduit 18 may be pressurized from the pressure source 22 to the inducer 12. An increase in pressure at the outlet pressure sensor 30 may indicate a leak in the inducer valve 52. A leak may be further tested for by closing the inlet valve 26 and waiting a predetermined amount of time. The leak, if present, will thereby result in a pressure drop at the inlet pressure sensor 28. If the leak is confined to the inducer valve 52, a corresponding increase in fluid pressure may be sensed at the outlet pressure sensor 30. However, leaks to a housing and/or fittings of the inducer 12 may result in an overall drop in fluid pressure.

In addition, the processor 78 is configured to determine one or more other parameters associated with the inducer 12. These parameters may include a "cracking pressure" of the inducer, a "full open" travel, and a maximum travel of the inducer 12. The term "cracking pressure" is utilized to describe the force or pressure at which the inducer valve 52 is caused to open. The term "full open" is utilized to described an amount of travel at which further opening of the inducer valve 52 does not result in greater flow of fluid. The term maximum travel or max travel is utilized to describe an amount of travel at which essentially no further travel may occur without permanently deforming components of the inducer 12. An example of one or more procedures that may be performed in order to determine these parameters is described herein.

Furthermore, the processor 78 is configured to determine a status of the inducer 12. The status may include pass, fail, out of adjustment, or defective. This status may be determined based on the results of one or more tests. For example, if the processor 78 determines that the fluid conduit 18 leaks, the processor 78 may determine that the inducer 12 is defective or otherwise in need of repair. In another example, if the processor 78 determines that the cracking pressure is outside a predetermined range of acceptable cracking pressures, the processor 78 may determine that the inducer 12 is out of adjustment.

Figure 4:
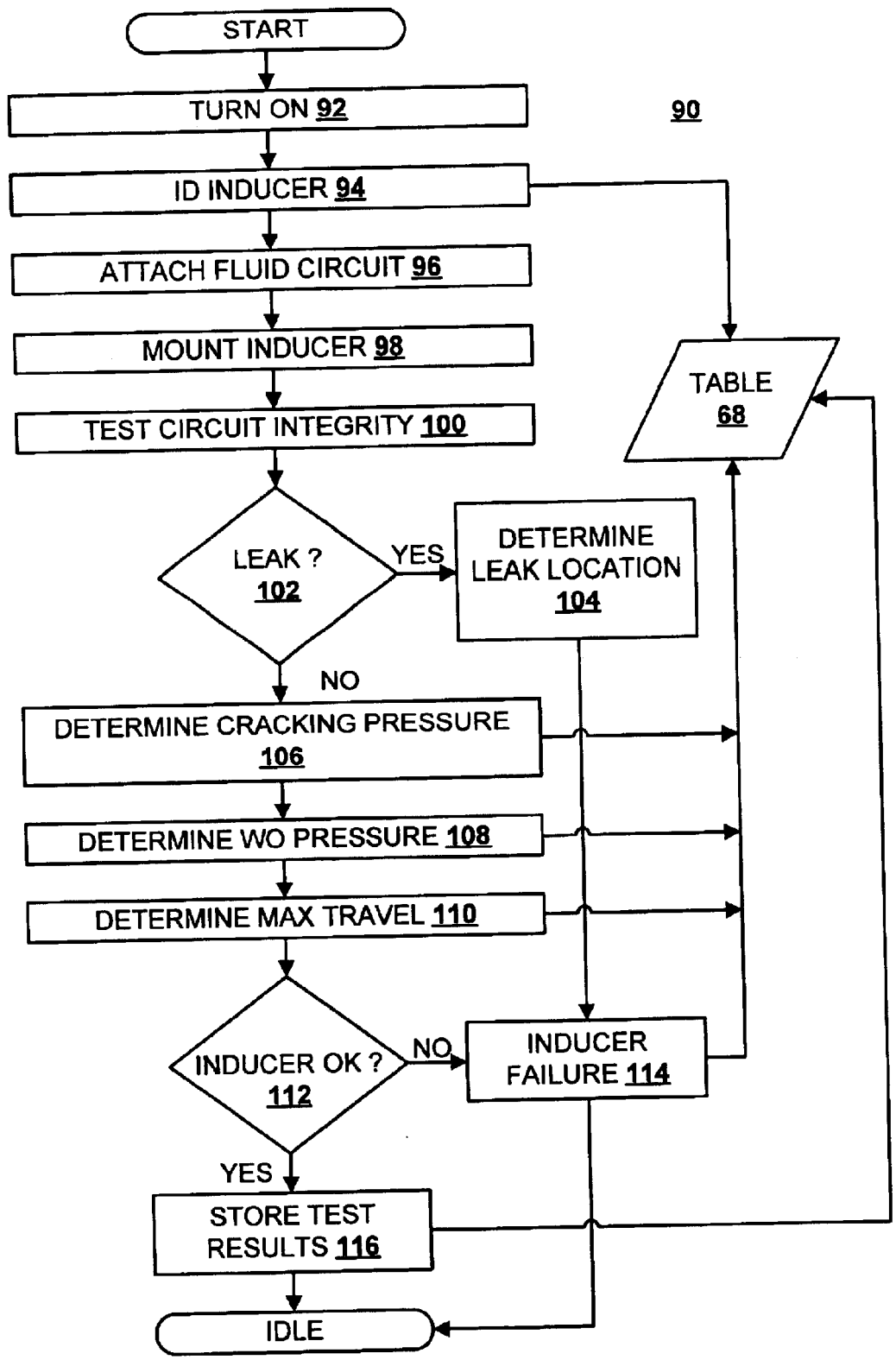
FIG. 4 is a flow diagram according to an embodiment of the invention.

FIG. 4 is a flow diagram of a method 90 for testing the inducer 12. As shown in FIG. 4, the method 90 may be initiated in response to turning on the tester 10 at step 92. At steps 94 to 98 the inducer 12 may be prepared for testing. For example, at step 94 the inducer 12 is identified by sensing the ID 54 with the scanner 64. In addition, the reading for the ID 54 is utilized to retrieve data associated with the inducer 12 from table 68 and/or the database 72. In this manner, any testing history for the inducer 12 may be retrieved and compared to data ascertained while performing the method 90. Furthermore, if the table 68 has not yet been created for the inducer 12, at step 94, the table 68 is generated. Moreover, the table 68 may be stored to the memory 66 and/or the database 72 at step 94.

At step 96 the fluid conduit 18 is attached to the inducer 12. For example, the various components of the fluid conduit 18 may be interconnected via hoses or the like. In addition, the tail adapter 14 and the head adapter 16 may, optionally, be attached to the inducer 12.

At step 98 the inducer 12 is mounted in the tester 10. For example, the inducer 12 may be disposed between the platform 42 and the arm 46. In addition, the linear potentiometer 40 is zeroed manually or automatically. In an embodiment of the invention, the linear potentiometer 40 is zeroed by sliding the linear potentiometer 40 along the stand 34 until the arm 50 makes contact with the platform 42. In another embodiment in which a servo motor is utilized in the actuator 36, the actuator 36 is controlled to raise the inducer 12 until contact is sensed by the load cell 38. At this point, the travel is determined to be zero.

At step 100 the integrity of the fluid conduit 18 and the inducer 12 is evaluated. For example, the inducer valve 52 may be opened by modulating the actuator 34 to exert sufficient force upon the inducer 12, the inlet valve 26 may be opened, the outlet valve 32 may be closed, and regulated pressure may be introduced to the fluid conduit 18 by the pressure source 22. In this manner, the fluid conduit 18 is pressurized from the pressure source 22 to the outlet valve 32.

At step 102 it is determined if a leak is present. For example, by closing the inlet valve 26 and waiting a predetermined amount of time a leak, if present, will thereby result in a pressure drop at the inlet pressure sensor 28 and outlet pressure sensor 30. The predetermined amount of time may be based upon a variety of factors. These factors include at least, viscosity of the test fluid, pressure of test fluid within the fluid conduit 18, manufacturers specification, empirical data, and the like. If it is determined that the inducer 12 is substantially free of leaks, the inducer 12 may be further tested at step 106. If it is determined that a leak is present at step 102, the location of the leak may be determined at step 104.

At step 104, the general location of the leak is determined. For example, pressure within the fluid conduit 18 may be released, the inducer valve 52 may be closed by modulating the actuator 34 to essentially remove any force upon the inducer 12, the inlet valve 26 may be opened, the outlet valve 32 may be closed, and regulated pressure may be introduced to the fluid conduit 18 by the pressure source 22. In this manner, the fluid conduit 18 may be pressurized from the pressure source 22 to the inducer 12. An increase in pressure at the outlet pressure sensor 30 may indicate a leak in the inducer valve 52. A leak may be further tested for by closing the inlet valve 26 and waiting a predetermined amount of time. The leak, if present, will thereby result in a pressure drop at the inlet pressure sensor 28. If the leak is confined to the inducer valve 52, a corresponding increase in fluid pressure may be sensed at the outlet pressure sensor 30. However, leaks to a housing and/or fittings of the inducer 12 may result in an overall drop in fluid pressure. Following the step 104, a failure of the inducer 12 may be noted and results associated with the method 90 may be stored to the table 68 at step 114.

At step 106 the cracking pressure of the inducer valve 52 is determined. In preparation for determining the cracking pressure, the fluid conduit 18 may be pressurized. For example, pressure within the fluid conduit 18 may be released, the inducer valve 52 may be closed by modulating the actuator 34 to essentially remove any force upon the inducer 12, the inlet valve 26 may be opened, the outlet valve 32 may be closed, and regulated pressure may be introduced to the fluid conduit 18 by the pressure source 22. In this manner, the fluid conduit 18 is pressurized from the pressure source 22 to the inducer 12. To determine the cracking pressure, the actuator 34 is modulated to place an increasing amount of load upon the inducer 12. In addition, the load cell 38 senses the increasing load, the linear potentiometer 40 and/or the actuator 34 senses any travel, and the inlet pressure sensor 28 and/or the outlet pressure sensor 30 senses the fluid pressure in the fluid conduit 18. In response to determining a change in fluid pressure within the fluid conduit 18, it is determined that the cracking pressure has been achieved. For example, a decrease in pressure upstream of the inducer valve 52 and/or an increase in pressure downstream of the inducer valve 52 is indicative that the cracking pressure has been achieved. In response to determining the cracking pressure has been achieved, the various sensed values such as fluid pressure, travel, load, and the like are stored to the table 68.

At step 108, the wide open pressure is determined. For example, the inlet valve 26 and outlet valve 32 may be opened and the pressure source 22 and/or the regulator 24 may be controlled to provide a sufficient supply of fluid so as to generate a detectable difference in fluid pressure between the inlet pressure sensor 28 and the outlet pressure sensor 28. In addition, the actuator 34 may be controlled to increase the load upon the inducer 12. In response to the increased load, the inducer valve 52 opens to a correspondingly greater extent. This further opening of the inducer valve 52 results in a reduction in the pressure differential between the inlet pressure sensor 28 and the outlet pressure sensor 30. The wide open pressure is determined to be the amount of load exerted upon the inducer 12 at which a further increase in load does not result in a further reduction in the pressure differential. To determine the wide open pressure, it may be advantageous to control the pressure source 22 and/or the regulator 24 to increase the fluid supply during the step 108 to thereby facilitate maintaining a detectable pressure differential. According to another embodiment of the invention, a flow meter may be utilized to determine the wide open pressure. In this embodiment, the flow meter is disposed in the fluid conduit 18 and configured to determine a fluid flow rate passing through the inducer 12. In response to the inducer valve 52 further opening, the flow meter senses a corresponding increase in flow. In this embodiment, the wide open pressure is determined to be the amount of load exerted upon the inducer 12 at which a further increase in load does not result in a further increase in flow through the fluid conduit 18. In response to determining the wide opening pressure, the various sensed values such as fluid pressure, fluid flow, travel, load, and the like are stored to the table 68.

At step 110 the maximum travel is determined. For example, the load exerted by the actuator 12 upon the inducer 12 is increased until essentially no further travel is sensed by the linear potentiometer 40 and/or the actuator 34. In another example, a predetermined amount of load is exerted upon the inducer 12 by the actuator 34. This predetermined amount of load is based on a plurality of factors such as, for example, a nominal amount of load expected during milling or boring operations, manufacturers specifications, empirical testing, and the like. In response to determining the maximum travel, the various sensed values such as fluid pressure, fluid flow, travel, load, and the like are stored to the table 68.

At step 112 it is determined whether the inducer 12 is operating within predetermined parameters. For example, one or more of the cracking pressure, wide open pressure, and maximum travel are compared to a respective predetermined range of values. If it is determined that the inducer 12 is operating within the predetermined parameters, it is determined that the inducer 12 has passed and, at step 116, the results of the method 90 are stored to the table 68. If it is determined that at least one of the cracking pressure, wide open pressure, or maximum travel are outside the respective predetermined range values, it is determined that the inducer 12 has failed the test. In response to the inducer 12 failing the method 90, at step 114, the date and time of the failure are stored to the table 68.

At step 114 the date and time of the failure are stored to the table 68. For example, a timestamp and the ID 54 may be stored along with at least one of the cracking pressure, wide open pressure, or maximum travel. In addition any failing parameter may be flagged. In this manner, the results of the method 90 may facilitate servicing the inducer 12. Following the step 114, the tester 10 may idle until instructed to perform another test.

At step 116 the date and time of the method 90 are stored to the table 68. For example, a timestamp and the ID 54 are stored along with at least of the cracking pressure, wide open pressure, or maximum travel. In addition, by comparing the results of the method 90 performed at a plurality of instances, the results of the method 90 may be utilized to determine a performance trend of the inducer 12. This performance trend may be utilized to service the inducer 12 prior to a failure. Following the step 114, the tester 10 may idle until instructed to perform another test.

Additionally, the method 90 may be performed a plurality of times and average values calculated from the determined values at each iteration. Furthermore, the inducer 12 may be fatigue tested in a similar manner. For example, the method 90 is performed until at least one parameter is outside its corresponding predetermined value. In this manner, response characteristics of the inducer 12 is determined over the useful life of the inducer 12.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A device for evaluating a fluid inducer, the fluid inducer having an inducer valve operable to open in response to a load, the device comprising:
   a fluid conduit for pressurizing the fluid inducer with a fluid;
   a pressure sensor that senses the pressure in the fluid conduit;
   an actuator for applying the load to the fluid inducer; and
   a load sensor that determines the load in response to the sensed pressure.

2. The device according to claim 1, further comprising:
   a linear potentiometer for determining an amount of travel experienced by the inducer in response to the load.

3. The device according to claim 1, wherein the pressure sensor comprises:
   an inlet pressure sensor disposed upstream of the inducer valve to sense the pressure in the fluid conduit upstream of the inducer valve; and
   an outlet pressure sensor disposed downstream of the inducer valve to sense the pressure in the fluid conduit downstream of the inducer valve.

4. The device according to claim 1, further comprising:
   an inlet valve disposed upstream of the inducer valve and the pressure sensor to control an amount of fluid entering the fluid conduit.

5. The device according to claim 1, further comprising:
   an outlet valve disposed downstream of the inducer valve and the pressure sensor to control an amount of fluid exiting the fluid conduit.

6. The device according to claim 1, further comprising:
   a controller configured to modulate the actuator and receive transmissions from the actuator, the pressure sensor, and the load sensor, wherein the controller further pressurizes the fluid inducer with the fluid, determines a fluid integrity of the fluid inducer in response to sensing the pressure of the fluid, and determines a load response of the fluid inducer in response to the load.

7. An apparatus for evaluating a fluid inducer, the fluid inducer having an inducer valve operable to open in response to a load, the apparatus comprising:
   means for pressurizing the fluid inducer with a fluid;
   means for determining a fluid integrity of the fluid inducer in response to sensing the pressure of the fluid; and
   means for determining a load response of the fluid inducer in response to a load being exerted upon the fluid inducer.

8. The apparatus according to claim 7, further comprising:
   means for determining an average load response, wherein the average load response is calculated in response to determining the load response a predetermined number of times.

9. The apparatus according to claim 7, further comprising:
   means for determining a fatigue value, wherein the fatigue value is determined in response to evaluating the fluid inducer until failure.

10. The apparatus according to claim 7, further comprising:
    means for determining if the fluid inducer has a leak; and
    means for determining a location of the leak in response to determining that the fluid inducer has a leak.

11. The apparatus according to claim 10, further comprising:
    means for pressurizing the fluid inducer prior to the inducer valve; and
    means for determining the inducer valve has the leak in response to a sensed pressure change in the fluid.

12. The apparatus according to claim 7, wherein the means for determining the load response further comprises:
    means for determining a cracking pressure.

13. The apparatus according to claim 12, further comprising:
    means for pressurizing the fluid inducer upstream of the inducer valve;
    means for modulating the load upon the fluid inducer; and
    means for determining whether the inducer valve is open in response to the load.

14. The apparatus according to claim 13, further comprising:
    means for sensing an inlet pressure at a location upstream of the inducer valve; and
    means for determining the inducer valve is open in response to a reduction of the sensed inlet pressure.

15. The apparatus according to claim 13, further comprising:
    means for sensing an outlet pressure at a location downstream of the inducer valve; and
    means for determining the inducer valve is open in response to an increase in the sensed outlet pressure.

16. The apparatus according to claim 7, wherein the means for determining the load response further comprises:
    means for determining a wide open pressure.

17. The apparatus according to claim 16, further comprising:
    means for generating a flow of fluid through the fluid inducer;
    means for modulating the load upon the fluid inducer; and
    means for determining the load at which an increase in the load does not result in an increase in the flow.

18. The apparatus according to claim 7, wherein the means for determining the load response further comprises:
    means for determining a maximum travel.

19. The apparatus according to claim 18, further comprising:
    means for modulating a load upon the fluid inducer;
    means for sensing travel of the fluid inducer in response to the load; and
    means for determining the travel at which an increase in the load does not result in an increase in the travel.

20. The apparatus according to claim 7, further comprising:
    means for storing measurements associated with the evaluation of the fluid inducer to a table.

21. The apparatus according to claim 20, further comprising:
    means for extrapolating a performance trend of the fluid inducer in response to the table.

22. The apparatus according to claim 20, further comprising:
    means for sensing an identity of the fluid inducer and accessing the table associated with the identity.

23. The apparatus according the claim 22, further comprising:
    means for generating the table in response to sensing the identity for a first time.

24. A method of evaluating a fluid inducer, the fluid inducer having an inducer valve operable to open in response to a load, the method comprising:
    pressurizing the fluid inducer with a fluid;
    determining a fluid integrity of the fluid inducer in response to sensing the pressure of the fluid; and
    determining a load response of the fluid inducer in response to a load being exerted upon the fluid inducer.

25. The method according to claim 24, further comprising:
    determining an average load response, wherein the average load response is calculated in response to determining the load response a predetermined number of times.

26. The method according to claim 24, further comprising:
    determining a fatigue value, wherein the fatigue value is determined in response to evaluating the fluid inducer until failure.

27. The method according to claim 24, further comprising:
    determining if the fluid inducer has a leak; and
    determining a location of the leak in response to determining that the fluid inducer has a leak.

28. The method according to claim 27 further comprising:
    pressurizing the fluid inducer prior to the inducer valve; and
    determining the inducer valve has the leak in response to a sensed pressure change in the fluid.

29. The method according to claim 24, wherein determining the load response further comprises:
    determining a cracking pressure.

30. The method according to claim 29, further comprising:
    pressurizing the fluid inducer upstream of the inducer valve;

modulating the load upon the fluid inducer; and determining whether the inducer valve is open in response to the load.

32. The method according to claim 30, further comprising:

sensing an inlet pressure at a location upstream of the inducer valve; and determining the inducer valve is open in response to a reduction of the sensed inlet pressure.

32. The method according to claim 30, further comprising:

sensing an outlet pressure at a location downstream of the inducer valve; and determining the inducer valve is open in response to an increase in the sensed outlet pressure.

33. The method according to claim 24, wherein determining the load response further comprises:

determining a wide open pressure.

34. The method according to claim 33, further comprising:

generating a flow of fluid through the fluid inducer;

modulating the load upon the fluid inducer; and determining the load at which an increase in the load does not result in an increase in the flow.

35. The method according to claim 24, wherein determining the load response further comprises:

determining a maximum travel.

36. The method according to claim 35, further comprising:

modulating a load upon the fluid inducer;

sensing travel of the fluid inducer in response to the load; and determining the travel at which an increase in the load does not result in an increase in the travel.

37. The method according to claim 24, further comprising storing measurements associated with the evaluation of the fluid inducer to a table.

38. The method according to claim 37, further comprising sensing an identity of the fluid inducer and accessing the table associated with the identity.

39. The method according the claim 38, further comprising generating the table in response to sensing the identity for a first time.

40. The method according to claim 37, further comprising extrapolating a performance trend of the fluid inducer in response to the table.

* * * * *